Patented Dec. 17, 1929

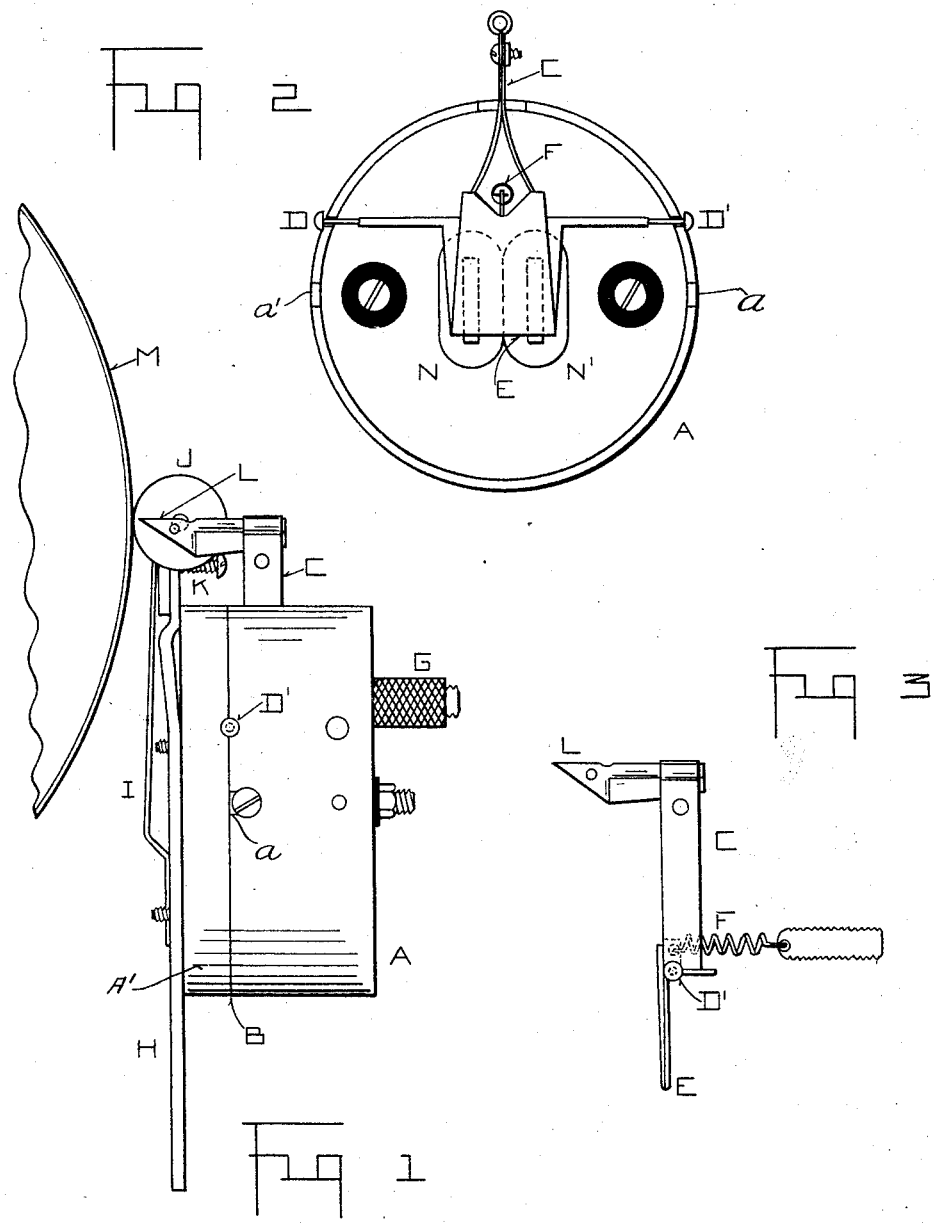

1,740,353

UNITED STATES PATENT OFFICE

CHARLES FRANCIS JENKINS, OF WASHINGTON, DISTRICT OF COLUMBIA, ASSIGNOR TO JENKINS LABORATORIES, OF WASHINGTON, DISTRICT OF COLUMBIA, A CORPORATION OF THE DISTRICT OF COLUMBIA

WEATHER-MAP PEN BOX

Application filed October 31, 1927. Serial No. 230,070.

This invention relates to devices used in recording weather maps, transmitted from a central land station and received by radio aboard ships at sea.

The principal object is a construction which will produce an accurate copy; which will require the least current to operate the recording stylus; and which is most accessible in adjustment.

In a six-months experimental transmission of weather maps, broadcast from a land station and picked up by radio and reassembled aboard ships at sea, it has been found that slackness between parts which is inconsequential on a stationary platform attain an unsuspected importance in this work when the receiving machine is used aboard a rolling ship.

The method of weather-maps-by-radio reception consists in the employment of a rotating drum carrying a base-map upon which the weather map is built up line by line, each line a multiplicity of dots applied by an ink-charged pen caused to contact with the moving base-map by amplified electrical impulses received by radio.

It will readily be seen, therefore, that any lateral loose-motion of the pen arm might easily put a dot in an adjacent line instead of in the line in which it belongs, with the result that the map is less legible than it should be, especially in the readings at the ends of the isobars, and the like.

Much greater accuracy was attained by having very widely separated bearings for the pen arm, which permits only an inappreciable movement of the pen-arm transverse of the direction of movement of the paper base-map under the pen. A pivot bearing at least as long as the radius of the pen-arm is desirable.

In order to conserve the energy required to operate the pen, it is desirable to maintain the pen point in a position the closest possible to the base-map, with means for adjusting it for this minute clearance. The most constant spacing is attained when the adjustment bearing is directly against the cylinder and closely adjacent the point of contact of the pen.

This bearing when made of a sliding shoe produces slight unevenness in the rotation of the drum, so a rolling bearing was substituted with marked improvement in the quality of radio weather map and its accurate location on the base-map.

With these and other objects in view, the invention consists of the novel combination of parts hereinafter described, illustrated in the drawings, and particularly pointed out in the claims.

In the drawings Figure 1 is an elevation of the pen-box; Figure 2 an inside view of the box removed from the supporting cap; and Figure 3 the pen-box arm.

In the figures, like symbols refer to like parts, A being the pen-box; B the line of parting between the box and its cover A', the box and cover having substantially semi-circular recesses $a$ and $a'$ respectively, adapted to register to form bearings. C is the pen-arm; D and D' the journals adapted to operate in the respective bearings $a$ and $a'$; E is the armature of the pen-arm; F the pen-arm spring; G a nut for regulating the tension of the pen-arm spring; H is an arm to which the pen-box cap is fastened; I an elastic member fastened to the arm H, and having rotatively mounted in its movable top a pair of rollers or disc wheels J (only one of which is shown). The distance between the arm H and the elastic member I is adjusted by the screw K which is threaded into arm H very close to its top. This effectively adjusts the separation between the pen point L and the base-map surface of the cylinder M. N and N' are electro-magnets through which the incoming radio signals pass, amplified, for moving the pen arm.

In operation, the pen-box location is adjusted by means of the screw K until the pen-point lies very close to the base-map on the cylinder M, so that (when the cylinder M is in motion) incoming signals make dots or lines on the paper base-map, the pen arm moving in the pivots D D'. Because these pivots are wide apart linearly very accurately placed dots result.

Obviously I do not wish to limit myself to the exact means shown for securing a wide stylus bearing, as other structures would give (1) the necessary wide bearing, and (2) the constant space between paper and pen.

What I claim, is—

1. In a device of the class described, the combination of a moving surface, a box including a cover, the box and cover being provided at their meeting edges with coinciding recesses forming spaced bearings, said box having an opening in a wall located midway between the spaced bearings, a stylus arm provided with laterally projecting journals at its inner end mounted in said bearings, the said journals being spaced apart a distance greater than the length of the arm, the outer end of the arm projecting through the said opening in the box and cooperating with the moving surface.

2. In a device of the class described, the combination of a moving surface to be marked, a box having an opening therein, a marking stylus arm pivotally mounted in said box and projecting at one end through said opening, electromagnetic means for operating said arm, and a resilient member connected with the box and having a rolling bearing against the moving surface and holding the stylus point closely adjacent to and normally spaced from, the said moving surface.

3. In a device of the class described, the combination of a moving surface to be marked, a box having an opening therein, a marking stylus arm pivotally mounted in said box and projecting at one end through said opening, electromagnetic means for operating said arm, an arm upon which the box is mounted, a resilient member secured at one end to the arm and provided at one end with a roller bearing against the moving surfaces and holding the marking stylus point closely adjacent to and normally out of contact with the said moving surface.

In testimony whereof I have affixed my signature.

CHARLES FRANCIS JENKINS.